US 6,501,064 B2

(12) United States Patent
Kole

(10) Patent No.: US 6,501,064 B2
(45) Date of Patent: Dec. 31, 2002

(54) IMAGE SENSOR WITH ACTIVE SENSOR ELEMENTS

(75) Inventor: Marcus Egbert Kole, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 16 days.

(21) Appl. No.: 09/773,415

(22) Filed: Feb. 1, 2001

(65) Prior Publication Data

US 2001/0025912 A1 Oct. 4, 2001

(30) Foreign Application Priority Data

Feb. 4, 2000 (EP) ............................................ 00200378

(51) Int. Cl.$^7$ ............................................ H01L 27/00
(52) U.S. Cl. .............................. 250/208.1; 250/214 A; 250/214 LS; 250/214 LA; 348/308; 348/309
(58) Field of Search ..................... 250/208.1, 214 A, 250/214 LA, 214 LS; 348/308, 309; 356/221, 222, 223

(56) References Cited

U.S. PATENT DOCUMENTS

| | | | | |
|---|---|---|---|---|
| 5,892,541 A | * | 4/1999 | Merrill | ........................ 348/302 |
| 5,949,061 A | | 9/1999 | Guidash | ................... 250/208.1 |
| 5,962,844 A | * | 10/1999 | Merrill et al. | ........... 250/214 A |
| 6,097,022 A | * | 8/2000 | Merrill et al. | ............ 250/208.1 |

FOREIGN PATENT DOCUMENTS

| | | |
|---|---|---|
| DE | 4409835 A1 | 10/1994 |
| EP | 0865197 A2 | 9/1998 |
| EP | 0898419 A2 | 2/1999 |

OTHER PUBLICATIONS

"CMOS Active Pixel Sensor Star Tracker with Regional Electronics Shutter", by O. Yadid–Pecht et al., IEEE Journal of Solid–State Circuits, vol. 32, No. 2, Feb. 1997.
"CMOS Image Sensors: Electronic Camera on a Chip", by Eric R. Fossum, IEDM 95.

* cited by examiner

Primary Examiner—Robert H. Kim
Assistant Examiner—Allen C. Ho
(74) Attorney, Agent, or Firm—Steven R. Biren

(57) ABSTRACT

An image pick-up includes a number of active sensor elements (11; 12; 13; 14) arranged in an array and a number of conductive lines extending over the surface of the array for the transfer of supply and signals. Each sensor element includes a light sensor (20) and an amplifier. According to the invention, a reduction in the number of lines can be achieved while functionality is maintained. In a first and a second embodiment (11; 12), a sensor element includes a first switch (S1) associated with the sensor and a second switch (S2; S3) associated with the amplifier, the switches being controlled by a common control signal. In a third embodiment (13), a sensor element includes a series arrangement of a first switch (S1) and a second switch (S2) included between the sensor and a supply line. In a fourth embodiment (14), a select signal is also used as a supply for the amplifier.

31 Claims, 6 Drawing Sheets

IMAGE SENSOR WITH ACTIVE SENSOR ELEMENTS

BACKGROUND OF THE INVENTION

The present invention relates in general to an image sensor with active sensor elements, more in particular to a CMOS image sensor.

Image sensors are generally known. Reference may be made, for example, to the publication "CMOS Image Sensors: Electronic Camera-On-A-Chip" by Erik R. Fossum in "Proceedings of the IEEE International Electron Devices Meeting 1995, pp. 17–25".

In general, an image pick-up or image sensor comprises a plurality of sensor elements which are positioned next to one another in a regular array. Each sensor element is sensitive to light and provides an electric signal which corresponds to the light received by the sensor element. When an image is projected onto the array of sensor elements of the image sensor, each sensor element provides an electric signal which is representative of one picture element or pixel of the projected picture.

Each of the active sensor elements comprises a photosensitive member such as, for example, a photodiode for converting a light signal into an electric signal, and an amplifier member for amplifying the electric signal generated by the photosensitive member. The sensor element is to be provided with a supply voltage and control signals for causing the sensor element to function. Furthermore, the output signals of the sensor elements are to be offered to a signal-processing device. For this purpose, conductive tracks extend over the surface of the pixel matrix, which tracks are connected to respective inputs or outputs of the sensor elements. Said tracks are made of metal and accordingly are impermeable to light, so that these tracks lead to a reduction in the surface area of the sensor elements which is effectively available for receiving light.

SUMMARY OF THE INVENTION

It is a main object of the present invention to provide an active image sensor in which the number of connection tracks extending over the sensor matrix is reduced while the functionality remains the same. A major advantage offered thereby is an improvement in the effective light-receiving surface area of each sensor element.

BRIEF DESCRIPTION OF THE DRAWING

To achieve this object, the present invention offers a number of variants which may be used as desired, in dependence on the circumstances and on additional advantages desired by the designer, which variants will be explained in more detail below with reference to the drawing, in which identical or comparable components have been given the same reference numerals and in which.

DESCRIPTION OF THE PREFERRED EMBODIMENT

Figure 1:
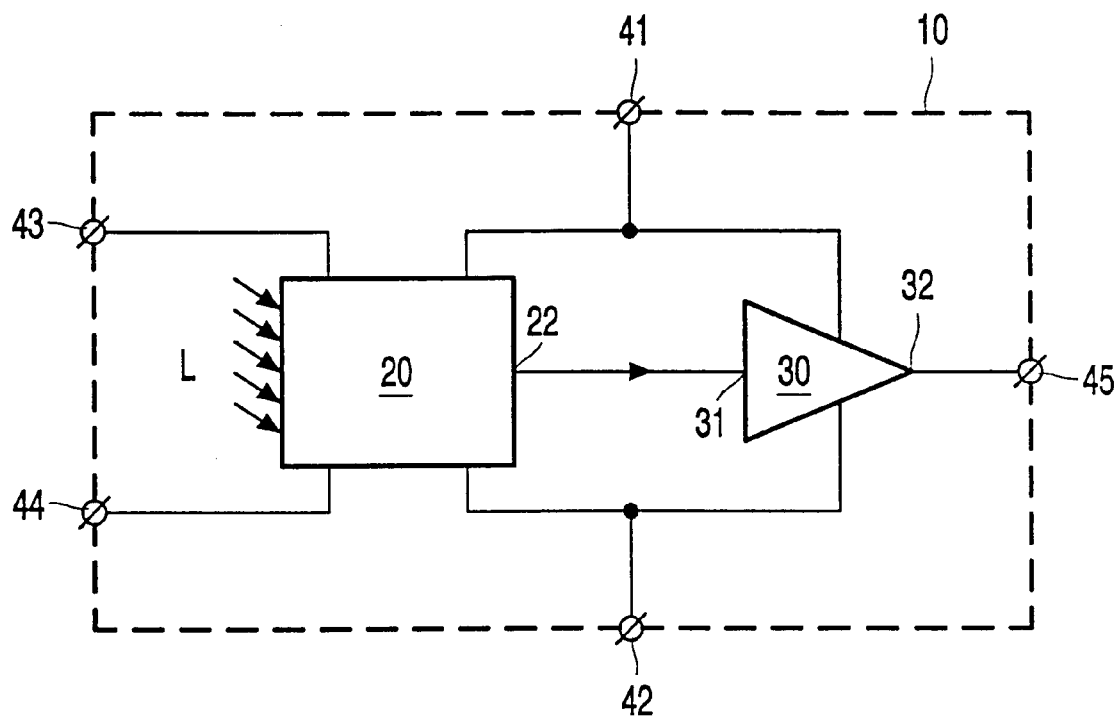
FIG. 1 diagrammatically shows the main components of a sensor element of an image sensor.

FIG. 1 is a circuit diagram of an active sensor element which has been given the general reference numeral 10. The sensor element 10 comprises a light sensor 20, i.e. a photosensitive element which provides at its output 22 an electric signal which corresponds to the light L received by the light sensor 20. The electric output 22 of the light sensor 20 is connected to an input 31 of an amplifier circuit 30, which amplifier circuit 30 has an output 32 for providing an amplified electric signal based on the electric output signal of the light sensor 20 received at the input 31.

When an image sensor is switched off, the sensor elements receive no supply voltage and are in a first state which will be referred to as "off-state" or "inactive state". During operation of an image sensor, when the supply voltage is present, the individual sensor elements will be periodically selected so as to be read out, i.e. they will then supply an output signal for further processing. This operational state of a sensor element will be referred to as the "selected state". Between consecutive selected states, the light sensor is active in accumulating an electric signal which corresponds to an integration of the quantity of received light, during which the sensor element does not offer an output signal at its output 45. This operational state of a sensor element will be referred to as "integration state". The light sensor 20 is reset prior to the integration so as to ensure that the output signal provided during read-out corresponds exclusively to the quantity of light received during the preceding integration period; this operational state will be referred to as "reset state".

Control signals are necessary for bringing a sensor element into one of the above operational states. Furthermore, at least two supply voltages are necessary for a satisfactory operation of the sensor element.

A conventional sensor element has four inputs for receiving said supply voltages and control signals, i.e., as shown in FIG. 1: a first supply input 41, a second supply input 42, a select signal input 43, and a reset signal input 44. The sensor element 10 also has a signal output 45. The two supply inputs 41 and 42 serve to supply the light sensor 20 and the amplifier 30 with the correct supply voltage. The select signal input 43 and the reset signal input 44 serve for receiving a select signal and a reset signal, respectively, for setting said three operational states.

The image sensor will have to be provided with a corresponding number of conductive tracks for the input and output of signals to and from all the sensor elements, which has the disadvantages discussed above.

Two binary control signals are used for setting said three operational states in the conventional situation, i.e. both the select signal and the reset signal can assume two signal values in the conventional situation, which will be referred to as "active signal value" and "inactive signal value", respectively.

The reset state is achieved in that a reset signal with an active signal value is offered; the signal value of the select signal has no influence then.

The selected state is achieved in that a reset signal with an inactive signal value is offered and a select signal with an active signal value is offered.

The sensor element 10 is in the integration state when both the select signal and the reset signal have the inactive signal value.

The present invention is based on the recognition that the select and reset signals never have the active signal value simultaneously in any of the above three operational states. According to an important aspect of the invention, it is possible to achieve the desired operational state by means of a control signal which is to be offered through one control input, the meaning of the offered control signal being determined by different possible signal values. This one control input will be referred to as "common reset/select signal input".

Figure 2A:
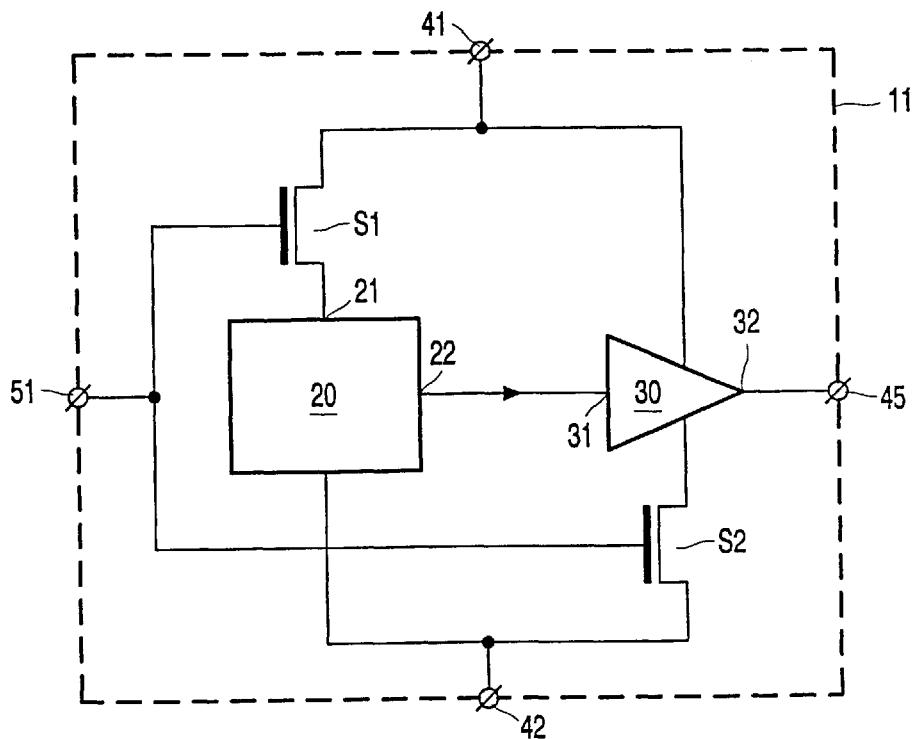
FIG. 2A is a diagrammatic illustration comparable to FIG. 1 of the design of a sensor element in a first embodiment of the invention.

FIG. 2A shows a first sensor element 11 according to the invention. The first supply input 41 is connected to a reset input 21 of the light sensor 20 via a first switch S1. The second supply input 42 is directly connected to the light sensor 20 and is connected to the amplifier 30 via a second switch S2. The two switches S1 and S2 have control inputs which are connected to a common control input 51 of the sensor element 11.

A signal which has three possible signal values is offered to the common control input 51, defining the operational state of the sensor element 11.

At a first signal value, both switches S1 and S2 are closed. Since the amplifier 30 does not receive the necessary supply voltage in that case, the sensor element will not supply an output signal, but the light sensor 20 is active; the sensor element 11 is accordingly in the integration state.

A second signal value is chosen such that the first switch S1 is conductive but the second switch S2 is not. The light sensor 20 is reset thereby; this is why the first switch S1 is also denoted the reset switch, and said second signal value is also called the reset signal.

At a third signal value, the second switch S2 is brought into a conductive state, but the first switch S1 is not. As a result, the amplifier 30 is correctly connected to the supply and is thus active in amplifying the signal offered by the light sensor 20 and in passing it on to the output 45. In other words, the sensor element is in the selected state. The second switch S2 is accordingly also referred to as selection switch, and said third signal value is called the select signal.

Figure 2B:
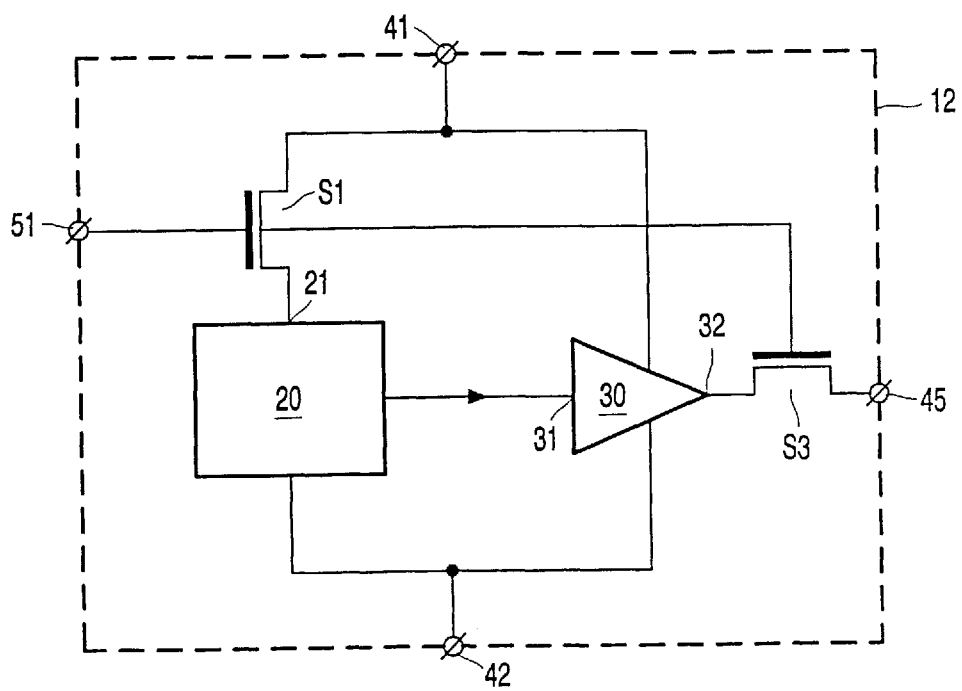
FIG. 2B is a diagrammatic illustration comparable to FIG. 2A of the design of a sensor element in a second embodiment of the invention.

In the first embodiment of FIG. 2A, the selection of the sensor element 11 is achieved through controlling a controllable selection switch S2 in a supply line to the amplifier 30. FIG. 2B shows a second embodiment of a sensor element 12 according to the present invention which differs from the first embodiment 11 shown in FIG. 2A in that a controllable selection switch S3 is included between the output 32 of the amplifier 30 and the output 45 of the sensor element 12. The operation of this variant, however, is identical to the operation discussed with reference to FIG. 2A.

Figure 2C:
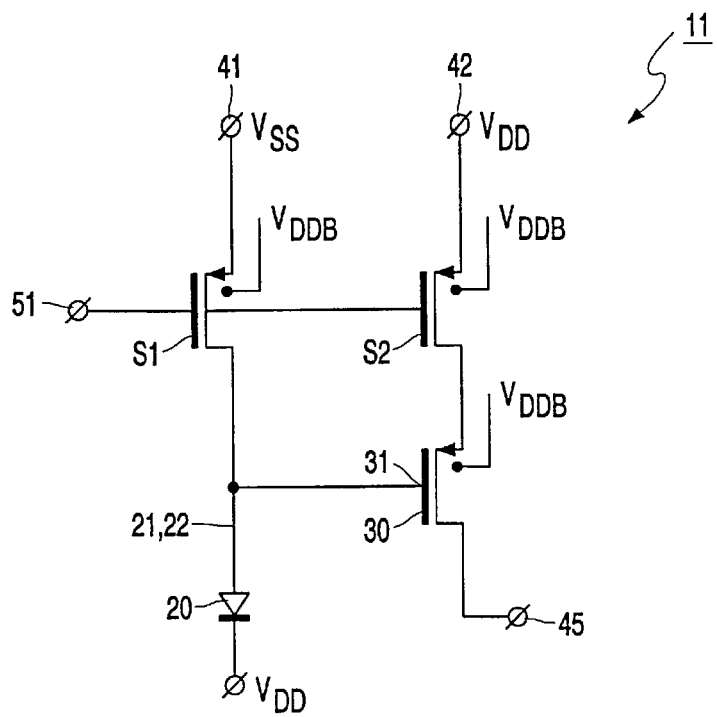
FIGS. 2C and 2D show chip implementations of the first embodiment shown in FIG. 2A.
Figure 2D:
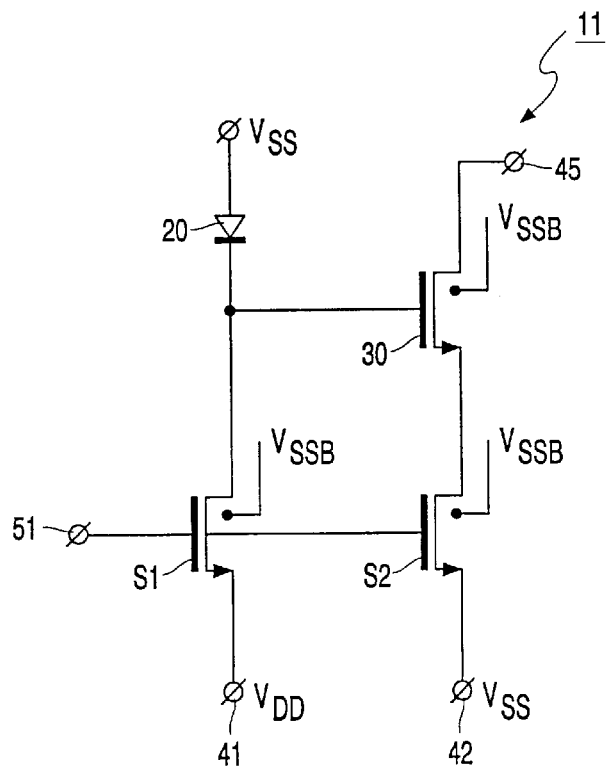
Figure 2E:
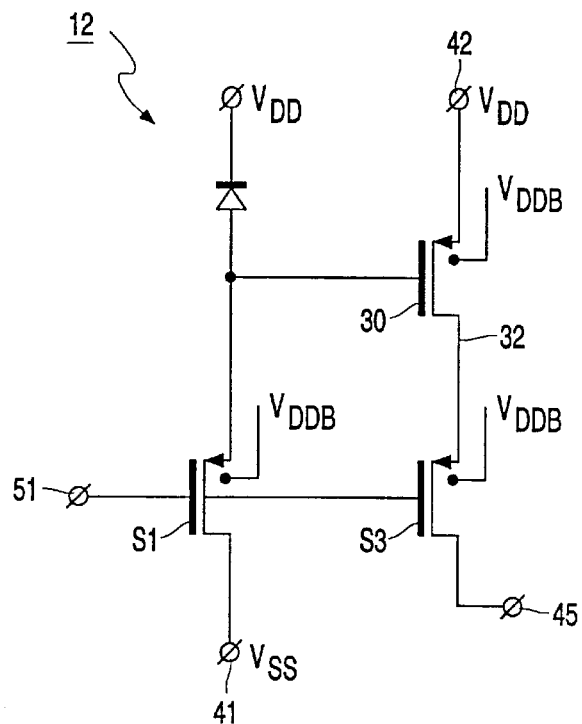
FIGS. 2E and 2F show chip implementations of the second embodiment shown in FIG. 2B.
Figure 2F:
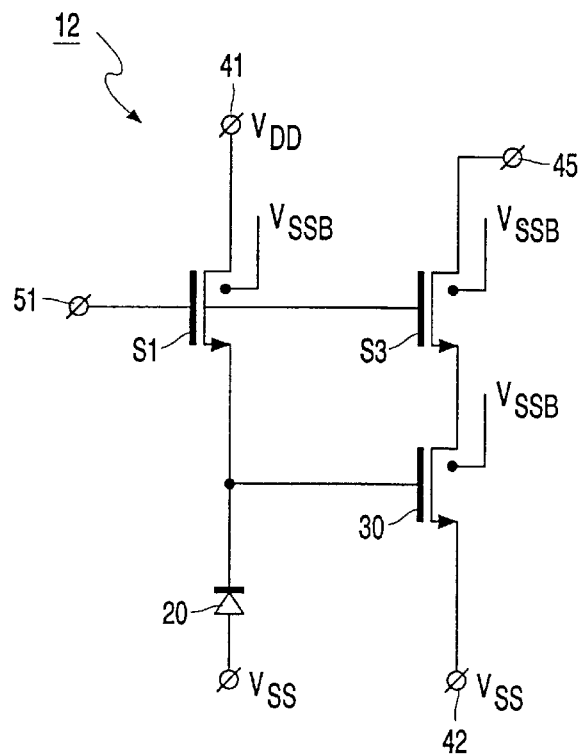

FIGS. 2C and 2D show two possible implementations of the first embodiment 11 discussed with reference to FIG. 2A, and FIGS. 2E and 2F show two possible implementations of the second embodiment 12 discussed with reference to FIG. 2B.

The amplifier 30 is constructed as a single MOS transistor in a common-source configuration in all four implementations shown, the base being connected to an output of the light sensor 20, which in all four implementations shown is represented as a photosensitive diode. The output signal of the sensor element 11, 12 will accordingly be a current whose strength is proportional to the output voltage of the light sensor 20. Furthermore, the controllable reset switch S1 and the controllable selection switch S2 or S3, as applicable, are constructed as single MOS transistors in all four implementations shown, so that a total of no more than three MOS transistors is necessary.

In the implementation of the first embodiment 11 shown in FIG. 2C, the drain of the amplifying transistor 30 is connected to the output terminal 45, and the base of the amplifying transistor 30 is connected to the anode of the photosensitive diode 20. The source of the amplifying transistor 30 is connected to the drain of the selection transistor S2, whose source is connected to the second supply input $V_{DD}$. The anode of the photosensitive diode 20 is furthermore connected to the drain of the reset transistor S1, whose source is connected to the first supply input $V_{SS}$. The gates of the reset transistor S1 and the selection transistor S2 are both connected to the control input 51. The cathode of the photosensitive diode is coupled to the second supply input $V_{DD}$.

The implementation of FIG. 2C is realized with three N-channel MOSFETs. The implementation of FIG. 2D is equivalent to that of FIG. 2C, but here P-channel MOSFETs are used.

In the implementation of FIG. 2E, the anode of the photosensitive diode 20 is connected to the gate of the amplifying transistor 30 and to the source of the reset transistor S1. The drain of the reset transistor S1 is connected to the first supply voltage $V_{SS}$. The source of the amplifying transistor 30 is connected to the second supply voltage $V_{DD}$, while the drain of the amplifying transistor 30 is connected to the source of the selection transistor S3, whose drain is connected to the output 45 of the sensor element 10. The gate of the selection transistor S3 and the gate of the reset transistor S1 are both connected to the reset/select signal input 51.

The implementation shown in FIG. 2E is realized by means of N-channel transistors. The implementation of FIG. 2F is equivalent to that of FIG. 2E, but here P-channel transistors are used.

The operation of the variant of the sensor element 11 shown in FIG. 2C will now be briefly discussed. The level of the first supply voltage $V_{SS}$ offered to the first supply input 41 is lower than the level of the second supply voltage $V_{DD}$ offered to the second supply input 42.

Normally, the level of the control signal offered to the control input 51 is substantially equal to the second supply voltage $V_{DD}$, so that the reset transistor S1 and the selection transistor S2 will both be non-conducting (integration state).

When the sensor element 11 is to be read out (selected state), a control signal with a level lower than the second supply voltage $V_{DD}$ is offered to the control input 51, so that the selection transistor S2 will conduct, but said level will be higher than the first supply voltage $V_{SS}$, so that the reset transistor S1 will still be non-conducting. The output signal at the output 45 is then fully defined by the voltage at the anode of the photosensitive diode 20.

For resetting the sensor 20, a control signal with a level lower than the first supply voltage $V_{SS}$ is offered to the control input 51, so that the reset transistor S1 and the selection transistor S2 will both be conducting.

Conventionally, resetting of a sensor element takes place simultaneously with resetting of all other sensor elements of a matrix lying on the same line. This is because it offers the advantage that all reset inputs of the sensor elements lying on this line can be controlled by one common conductive track. There is a demand for a matrix architecture, however, in which the pixels of the matrix can be individually reset. This renders it possible that the integration time per pixel can be adapted, which again enables a considerable increase in the dynamic range of a pixel. It is also possible then to address the pixels in a sequence other than the usual line-by-line sequence, because the integration time per pixel can still be kept the same.

CMOS image sensors are known in which the sensor elements or pixels can be individually reset. An example of this is described in the article "CMOS active pixel sensor star tracker with regional electronic shutter" by Orley Yadid-Pecht et al. in IEEE Journal of Solid State Circuits, vol. 32, 1979, no. 2, pp. 285–288. In the device described in the cited publication, however, an additional select line is necessary, i.e. a reset-select line. This known device accordingly requires two supply lines and four signal lines in all, i.e. an output line, a read-out/select line, a reset signal line, and a reset/select line. The present invention proposes a sensor element in which such an additional reset-select line is not necessary, so that the present invention also in this respect offers a reduction in the number of connection tracks extending over the sensor matrix while the functionality remains the same.

The present invention is based on the recognition that it is possible to retain the desired functionality while nevertheless the number of electric lines extending over the sensor matrix surface is reduced in that the information of two of said lines is combined in each sensor element.

According to a first approach to the present invention, a sensor element is reset in response to a reset signal only if this sensor element is at the same time selected by means of a select signal on the read-out/select line. A sensor element according to the invention for this purpose comprises means for carrying out an AND function on the reset signal and the select signal. A separate AND member may be provided for this purpose, but it is alternatively possible for the logic construction of the sensor element itself to contain the AND function.

Figure 3A:
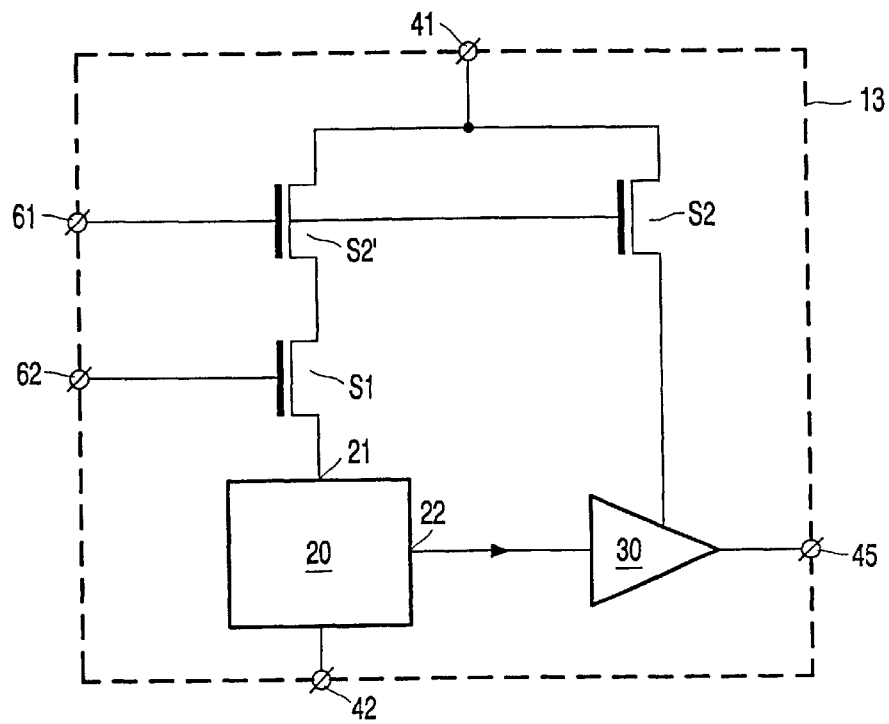
FIG. 3A is a diagrammatic illustration comparable to FIG. 2A of the design of a sensor element in a third embodiment of the invention.

FIG. 3A shows a third embodiment of a sensor element 13 according to the invention which offers said functionality in combination with a reduced number of connections compared with the cited publication. The image sensor 20 is directly connected to the second supply input 42. A first controllable selection switch S2 is connected between the amplifier 30 and the first supply input 41. A series arrangement of a controllable reset switch S1 and a second controllable selection switch S2' is included between the image sensor 20 and the first supply input 41. The control inputs of the two selection switches S2 and S2' are both connected to a select input 61 for receiving a select signal. The control input of the reset switch S1 is connected to a reset input 62 for the reception of a reset signal.

The operation of the embodiment shown in FIG. 3A is as follows. If the select signal received at the select input 61 has an inactive value, the switches S2 and S2' are non-conducting, and the sensor element 13 is in the integration state. The value of the reset signal received at the reset input 62 is irrelevant then.

If the value of the signal received at the select input 61 is active, whereas the signal received at the reset input 62 has an inactive value, the amplifier 30 is connected by the first selection switch S2 to the supply voltage at supply input 41, and the connection between the sensor 20 and the supply input 41 is broken by the non-conducting reset switch S1. The electric signal generated at the output 22 of the image sensor 20 is then offered in amplified form to the output 45 of the sensor element 13 by the amplifier 30, i.e. the sensor element is in the selected state.

If the value of the signal received at the select input 61 is active while the signal received at the reset input 62 also has an active value, the image sensor 20 is connected to the supply input 41 via the two switches S1 and S2', and the image sensor 20 is reset.

Said AND function is thus provided by the presence of two switches S1 and S2' connected in series between the light sensor 20 and the first supply connection 41, the one switch S1 being operated by the reset signal and the other switch S2' being operated by the select signal.

In the embodiment shown in FIG. 3A, the reset switch S1 is connected to the image sensor 20 and the second selection switch S2' is connected to the first supply input 41. The sequence of these two switches may be reversed in an alternative embodiment, so that the reset switch S1 is connected to the supply input 41 and the second selection switch S2' is connected to the image sensor 20.

The two selection switches S2 and S2' in the embodiment shown in FIG. 3A are both connected to the first supply input 41. In an alternative embodiment, these two selection switches may be combined into a single selection switch whose control input is connected to the select input 61, the one switch terminal being connected to the supply input 41 and the other switch terminal being connected to both the amplifier 30 and the reset switch S1.

The sensor element 13 in the embodiment shown in FIG. 3A is selected for read-out in that the amplifier 30 is connected to the supply input 41. The selection switch S2 is for this purpose coupled between the supply input 41 and the supply connection terminal of the amplifier 30. Alternatively, the amplifier 30 may be directly connected to the supply input 41, while the selection switch S2 is replaced by a selection switch S3 between the output 32 of the amplifier 30 and the output 45 of the sensor element 13, similar to the alternative to the embodiment of FIG. 2A described with reference to FIG. 2B.

Figure 3B:
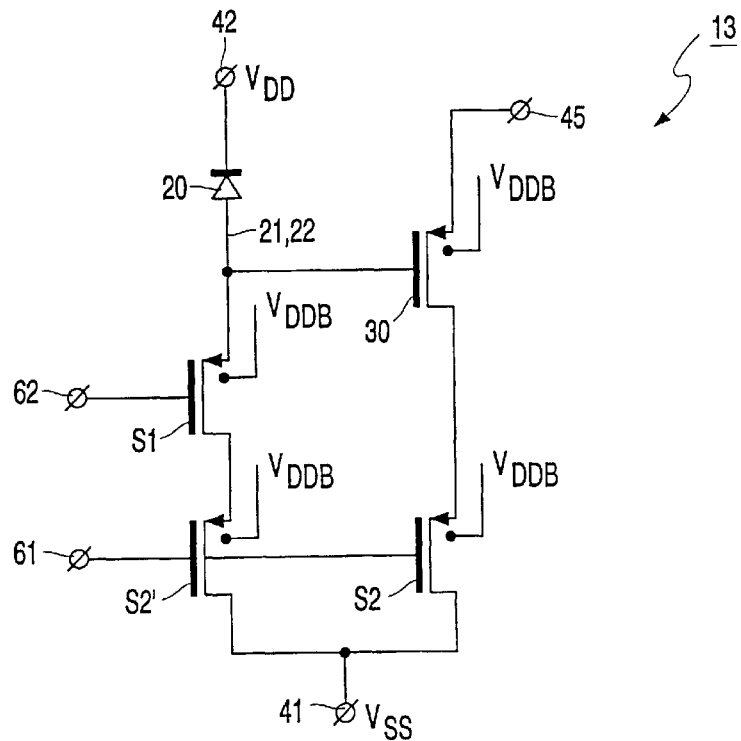
FIG. 3B shows a chip implementation of the third embodiment shown in FIG. 3A.

FIG. 3B shows an implementation of the embodiment of FIG. 3A. The amplifier 30 is here realized in the form of a single MOS transistor in a source follower configuration, so that the output signal will be a voltage which is proportional to the voltage across the photosensitive structure 20. The source of the amplifying transistor 30 is connected to the output 45 of the sensor element 13. The drain of the amplifying transistor 30 is connected to the source of the selection switching transistor S2, whose drain is connected to the first supply input 41. The light sensor 20 is shown again as a photosensitive diode whose anode is connected to the gate of the amplifying transistor 30 and to the source of the reset transistor S1. The drain of the reset transistor S1 is connected to the source of the second selection transistor S2' whose drain is connected to the first supply input 41. The gate of the reset transistor S1 is connected to the reset input 62. The gates of the selection transistors S2 and S2A' are connected to the select input 61.

The active value of the select signal and of the reset signal in this embodiment corresponds to LOW, while the inactive value of the select signal and of the reset signal corresponds to HIGH.

The implementation of FIG. 3B utilizes N-channel transistors; however, it will be obvious to those skilled in the art that an implementation based on P-channel transistors is also possible.

According to a second approach to the present invention, a sensor element is provided with a supply voltage only if this sensor element is at the same time selected by means of a select signal at the select line. The invention is then partly based on the recognition that a sensor element, if it is not selected, does not need any supply voltage either. A sensor element according to the invention for this purpose has a logic construction such that an active value of the select signal on the select line is at the same time used as a supply signal.

Figure 4A:
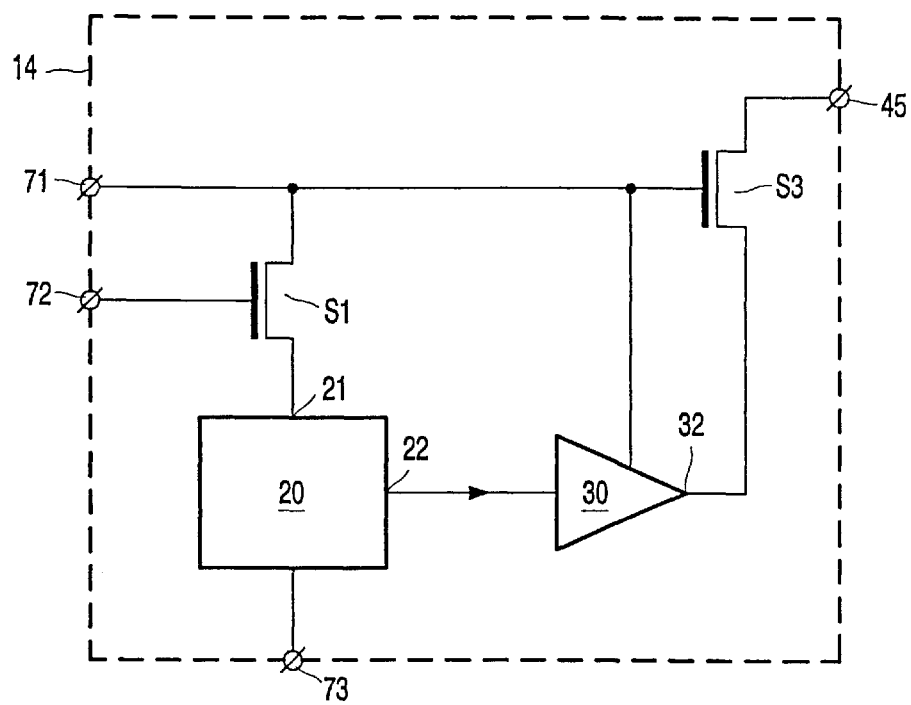
FIG. 4A is a diagrammatic illustration comparable to FIG. 2A of the design of a sensor element in a fourth embodiment of the invention.

FIG. 4A shows a fourth embodiment of a sensor element 14 according to the invention which offers the functionality mentioned above in combination with a number of connection lines which is reduced compared with the cited publication. This sensor element 14 only has a select input 71, a reset input 72, and a single supply input 73. The image sensor 20 is directly connected to the supply input 73. The amplifier 30 is connected to the select input 71 for the purpose of receiving a supply voltage. A controllable reset switch S1 is connected between the image sensor 20 and the select input 71, the control input of said switch being connected to the reset input 72 for the reception of a reset signal. Between the output 32 of the amplifier 30 and the output 45 of the sensor element 14 there is a controllable selection switch S3 whose control input is connected to the select input 71 for the reception of a select signal.

The operation of the embodiment shown in FIG. 4A is as follows. If the select signal received at the select input 71 has an inactive value, the switch S3 is non-conducting, so that the amplifier 30 is cut off from the output 45 and accordingly receives no supply. The sensor element 13 is then in the integration state. The value of the reset signal received at the reset input 72 is of no importance then.

If the signal received at the select input 71 has an active value while the signal received at the reset input 72 has an inactive value, the amplifier 30 receives the active value of the select signal as its supply voltage, the switch S3 is conducting for offering the output signal to the amplifier 30 at the output 45 of the sensor element 14, and the connection between the sensor 20 and the select input 71 is interrupted by the non-conducting reset switch S1. The electric signal generated at the output 22 of the image sensor 20 is then offered in amplified form at the output 45 of the sensor element 14 by the amplifier 20, i.e. the sensor element 14 is in the selected state.

If the value of the signal received at the select input 71 is active while that of the signal received at the reset input 72 is also active, the image sensor 20 is connected via the reset switch S1 to the active value of the select signal at select input 71, and the image sensor 20 is reset.

Figure 4B:
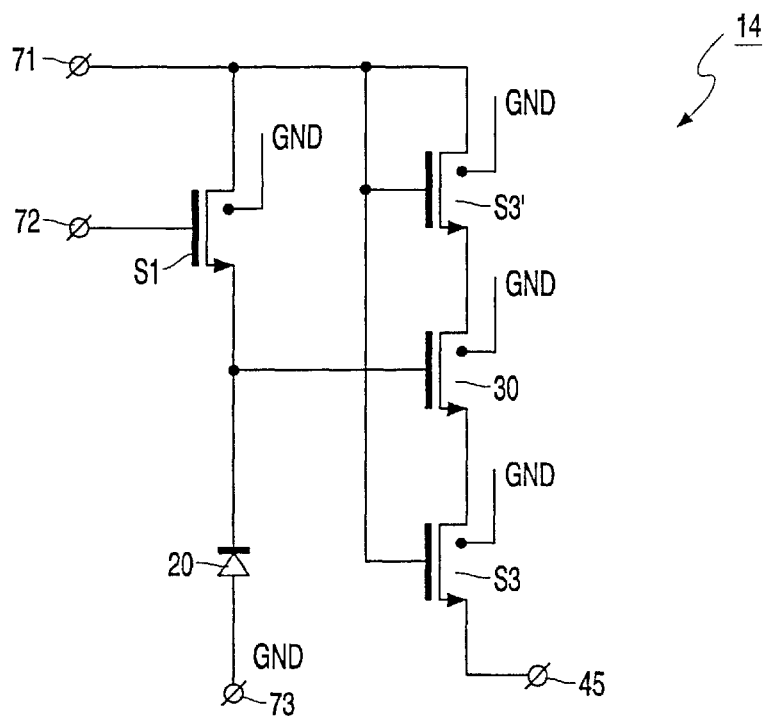
FIG. 4B shows a chip implementation of the fourth embodiment shown in FIG. 4A.

FIG. 4B shows an implementation of the embodiment of FIG. 4A on the basis of P-channel transistors; however, it will be obvious to those skilled in the art that an equivalent design on the basis of N-channel transistors is also possible.

The light sensor 20 is shown as a photosensitive diode again, whose anode is connected to the supply connection terminal 73 (GND) and whose cathode is connected to the gate of the amplifying transistor 30 and to the source of the reset transistor S1. The drain of the reset transistor S1 is connected to the select input 71, and the gate of the reset transistor S1 is connected to the reset input 72. The source of the amplifying transistor 30 is connected to the drain of the selection transistor S3, while the source of the selection transistor S3 is connected to the output 45. The gate of the selection transistor S3 is connected to the select input 71.

The drain of the amplifying transistor 30 is coupled to the select input 71.

The sensor element 14 is in the integration state when the signal level at the select input 71 is low.

If the signal level at the select input 71 is high while the signal level at the reset input 72 is low, the sensor element 14 is in the selected state.

If the signal level at the select input 71 is high while the signal level at the reset input 72 is also high, the sensor 20 is reset.

In principle, the drain of the amplifying transistor 30 may be directly connected to the select input 71. In the embodiment shown in FIG. 1B, a second selection transistor S3' is included between the drain of the amplifying transistor 30 and the select input 71, the gate of said transistor S3' being connected to the select input 71 so that the operation of this second selection transistor S3' is identical to the operation of the first selection transistor S3. The second selection transistor S3' offers the additional advantage that crosstalk of the signals at the select input to the photodiode 20 is reduced.

The present invention thus provides an image sensor which comprises a number of active sensor elements 11; 12; 13; 14 positioned in an array as well as a number of conductive lines extending over the surface of the array for the transport of supply voltages and signals. Each sensor element comprises a light sensor 20 and an amplifier 30.

According to the invention, a reduction of the number of conductive lines is achieved while the functionality is retained.

In a first and a second embodiment, a sensor element 11; 12 for this purpose comprises a first switch S1 associated with the sensor and a second switch S2; S3 associated with the amplifier, both switches being controlled by a common control signal.

In a third embodiment, a sensor element 13 for this purpose comprises a series arrangement of a first switch S1 and a second switch S2' connected between the sensor and a supply line. In a fourth embodiment 14, a select signal is at the same time utilized as a supply for the amplifier.

It will be obvious to those skilled in the art that the scope of the present invention is not limited to the examples discussed above but that various changes and modifications thereof are possible without departing from the scope of the invention as defined in the appended claims. Thus it is possible, for example, in the embodiment discussed with reference to FIG. 2A that the reset switch is provided between the sensor and one of the supply connection terminals, and that the selection switch is provided between the amplifier and that same supply connection terminal.

What is claimed is:

1. A sensor element comprising:
   a photosensitive member (20) for converting a light signal into an electric signal;
   an amplifier member (30) for amplifying the electric signal supplied by the photosensitive member (20);
   an output terminal (45) coupled to an output (32) of the amplifier member (30) for passing the amplified signal supplied by the amplifier member (30) to the exterior;
   a first supply connection terminal (41) for receiving a first supply voltage;
   a second supply connection terminal (42) for receiving a second supply voltage;
   a control connection terminal (51) for receiving a combined select/reset signal; and
   means coupled to the control connection terminal (51), which means are designed for:
   bringing the sensor element into an integration state in response to the reception of a combined select/reset signal having a first signal value; resetting the photosensitive member (20) in response to the reception of a combined select/reset signal having a second signal value; and bringing the sensor element into a selected state in response to the reception of a combined select/reset signal having a third signal value.

2. A sensor element as claimed in claim 1, comprising:
a first controllable switch (S1) connected between a reset terminal (21) of the photosensitive member (20) and the first supply connection terminal (41);
a second controllable switch (S2; S3) coupled to the amplifier member (30), a control input of said first controllable switch (S1) and a control input of said second controllable switch (S2; S3) being connected to said control connection terminal (51).

3. A sensor element as claimed in claim 2, wherein the second controllable switch (S2) is connected between the amplifier member (30) and a supply connection terminal, said supply connection terminal preferably being the second supply connection terminal (42).

4. A sensor element as claimed in claim 3, wherein the amplifier member (30) is a MOSFET whose drain is coupled to the output terminal (45); wherein the second controllable switch (S2) is a MOSFET whose drain is coupled to the source of the amplifier member (30), whose source is coupled to the second supply connection terminal (42), and whose gate is coupled to said control connection terminal (51); and wherein the first controllable switch (S1) is a MOSFET whose source is coupled to the first supply connection terminal (41) and whose gate is coupled to said control connection terminal (51).

5. A sensor element as claimed in claim 4, wherein the photosensitive member (20) is a photosensitive diode which is coupled to the gate of the amplifying transistor (30) and to the drain of the first controllable switching transistor (S1).

6. A sensor element as claimed in claim 2, wherein the second controllable switch (S3) is connected between the output (32) of the amplifier member (30) and the output terminal (45).

7. A sensor element as claimed in claim 6, wherein the amplifier member (30) is a MOSFET whose source is coupled to the second supply connection terminal (42); wherein the second controllable switch (S3) is a MOSFET whose source is coupled to the drain of the amplifier member (30), whose drain is coupled to the output terminal (45), and whose gate is coupled to said control connection terminal (51); and wherein the first controllable switch (S1) is a MOSFET whose drain is coupled to the first supply connection terminal (41) and whose gate is coupled to said control connection terminal (51).

8. A sensor element as claimed in claim 7, wherein the photosensitive member (20) is a photosensitive diode which is coupled to the gate of the amplifying transistor (30) and to the source of the first controllable switching transistor (S1).

9. An image sensor comprising a plurality of sensor elements (11; 12) as claimed in any one of the claims 1 to 8 which are positioned in an array, while the following components extend over the surface of the array of sensor element:
an output line coupled to the output terminals (45) of sensor elements (11; 12) lying in one line;
a first supply line coupled to the first supply connection terminals (41) of sensor elements (11; 12) lying in one line;
a second supply line coupled to the second supply connection terminals (42) of sensor elements (11; 12) lying in one line; and
a common select/reset line coupled to the control connection terminals (51) of sensor elements (11; 12) lying in one line.

10. A sensor element comprising:
a photosensitive member (20) for converting a light signal into an electric signal;
an amplifier member (30) for amplifying the electric signal supplied by the photosensitive member (20);
an output terminal (45) coupled to an output (32) of the amplifier member (30) for passing the amplified signal supplied by the amplifier member (30) to the exterior;
a first supply connection terminal (41) for receiving a first supply voltage;
a second supply connection terminal (42) for receiving a second supply voltage;
a first control connection terminal (61) for receiving a select signal;
a second control connection terminal (62) for receiving a reset signal; and
means coupled to the two control connection terminals (61, 62), which means are designed for: bringing the sensor element into an integration state in response to the reception of a select signal having a first signal value; bringing the sensor element into a selected state in response to the reception of a select signal having a second signal value and a reset signal having a first signal value; and resetting the photosensitive member (20) in response to the reception of a select signal having a second signal value and a reset signal having a second signal value.

11. A sensor element as claimed in claim 10, comprising:
a series arrangement of a first controllable switch (S1) and a second controllable switch (S2') connected between a reset terminal (21) of the photosensitive member (20) and the first supply connection terminal (41); wherein a control input of the first controllable switch (S1) is coupled to said second control connection terminal (62); and wherein a control input of the second controllable switch (S2') is coupled to said first control connection terminal (61).

12. A sensor element as claimed in claim 11, wherein the amplifier member (30) is a MOSFET whose source is coupled to the output terminal (45) and whose drain is coupled to the first supply connection terminal (41); wherein the first controllable switch (S1) is a MOSFET whose gate is coupled to said second control connection terminal (62); and wherein the second controllable switch (S2') is a MOSFET whose source is coupled to the drain of the first controllable switch (S1), whose drain is coupled to the first supply connection terminal (41), and whose gate is coupled to said first control connection terminal (61).

13. A sensor element as claimed in claim 12, wherein the photosensitive member (20) is a photosensitive diode which is coupled to the gate of the amplifying transistor (30) and to the source of the first controllable switching transistor (S1).

14. A sensor element as claimed in claim 11, wherein the amplifier member (30) is a MOSFET whose source is coupled to the output terminal (45) and whose drain is coupled to the first supply connection terminal (41); wherein the second controllable switch (S2') is a MOSFET whose gate is coupled to said first control connection terminal (61); and wherein the first controllable switch (S1) is a MOSFET whose source is coupled to the drain of the second controllable switch (S2'), whose drain is coupled to the first supply connection terminal (41), and whose gate is coupled to said second control connection terminal (62).

15. A sensor element as claimed in claim 14, wherein the photosensitive member (20) is a photosensitive diode which is coupled to the gate of the amplifying transistor (30) and to the source of the second controllable switching transistor (S2).

16. A sensor element as claimed in claim 11, wherein the amplifier member (30) is a MOSFET whose source is coupled to the output terminal (45); wherein the first controllable switch (S1) is a MOSFET whose gate is coupled to said second control connection terminal (62); and wherein the second controllable switch (S2') is a MOSFET whose source is coupled to the drain of the first controllable switch (S1) and to the drain of the amplifying transistor (30), whose drain is coupled to the first supply connection terminal (41), and whose gate is coupled to said first control connection terminal (61).

17. A sensor element as claimed in claim 16, wherein the photosensitive member (20) is a photosensitive diode which is coupled to the gate of the amplifying transistor (30) and to the source of the first controllable switching transistor (S1).

18. A sensor element as claimed in any one of the claims 11 to 15, further comprising a third controllable switch (S2) which is connected between the amplifier member (30) and the first supply connection terminal (41).

19. A sensor element as claimed in claim 18, wherein the third controllable switch (S2) is a MOSFET whose source is coupled to the drain of the amplifying transistor (30) whose drain is coupled to the first supply connection terminal (41), and whose gate is coupled to said first control connection terminal (61).

20. A sensor element as claimed in any one of the claims 11 to 15, further comprising a third controllable switch (S3) which is connected between the output (32) of the amplifier member (30) and the output terminal (45).

21. A sensor element as claimed in claim 20, wherein the third controllable switch (S3) is a MOSFET whose drain is coupled to the source of the amplifying transistor (30), whose source is coupled to the output terminal (45), and whose gate is coupled to said first control connection terminal (61).

22. An image sensor comprising a plurality of sensor elements (13) as claimed in any one of the claims 10 to 17 and positioned in an array, while the following components extend over the surface of the array of sensor elements:
- an output line coupled to the output terminals (45) of sensor elements (13) lying in one line;
- a first supply line coupled to the first supply connection terminals (41) of sensor elements (13) lying in one line;
- a second supply line coupled to the second supply connection terminals (42) of sensor elements (13) lying in one line;
- a select line coupled to the first control connection terminals (61) of sensor elements (13) lying in one line; and
- a reset line coupled to the second control connection terminals (62) of sensor elements (13) lying in one line.

23. A sensor element, comprising:
- a photosensitive member (20) for converting a light signal into an electric signal;
- an amplifier member (30) for amplifying the electric signal supplied by the photosensitive member (20);
- an output terminal (45) coupled to an output (32) of the amplifier (30) for passing the amplified signal supplied by the amplifier member (30) to the exterior;
- a supply connection terminal (73) for receiving a supply voltage;
- a first control connection terminal (71) for receiving a select signal;
- a second control connection terminal (72) for receiving a reset signal; and
- means coupled to the two control connection terminals (71, 72), which means are designed for: bringing the sensor element into an integration state in response to the reception of a select signal having a first signal value; bringing the sensor element into a selected state in response to the reception of a select signal having a second signal value and a reset signal having a first signal value; and resetting the photosensitive member (20) in response to the reception of a select signal having a second signal value and a reset signal having a second signal value.

24. A sensor element as claimed in claim 23, comprising:
- a first controllable switch (S1) coupled between a reset terminal (21) of the photosensitive member (20) and the first control connection terminal (71); wherein a control input of the first controllable switch (S1) is coupled to said second control connection terminal (72); and wherein a supply input of the amplifier member (30) is coupled to said first control connection terminal (71).

25. A sensor element as claimed in claim 24, wherein the amplifier member (30) is a MOSFET whose source is coupled to the output terminal (45), and whose drain is coupled to the first control connection terminal (71); and wherein the first controllable switch (S1) is a MOSFET whose gate is coupled to said second control connection terminal (72) and whose drain is coupled to the first control connection terminal (71).

26. A sensor element as claimed in claim 25, wherein the photosensitive member (20) is a photosensitive diode which is coupled to the gate of the amplifying transistor (30) and to the source of the first controllable switching transistor (S1).

27. A sensor element as claimed in any one of the claims 24 to 26, further comprising a second controllable switch (S3) coupled between the output (32) of the amplifier member and the output terminal (45).

28. A sensor element as claimed in claim 27, wherein the second controllable switch (S3) is a MOSFET whose source is coupled to the output terminal (45), whose drain is coupled to the output (source 32) of the amplifier member (30), and whose gate is coupled to the first control connection terminal (71).

29. A sensor element as claimed in any one of the claims 24 to 26, further comprising a third controllable switch (S3') connected between the supply input of the amplifier member (30) and the first control connection terminal (71).

30. A sensor element as claimed in claim 29, wherein the third controllable switch (S3') is a MOSFET whose source is coupled to the supply input (drain) of the amplifier member (30), whose drain is coupled to the first control connection terminal (71), and whose gate is coupled to the first control connection terminal (71).

31. An image sensor comprising a plurality of sensor elements (14) as claimed in any one of the claims 23 to 26 and positioned in an array, wherein the following extend over the surface of the array of sensor elements:
- an output line coupled to the output terminals (45) of sensor elements (14) lying in one line;
- a supply line coupled to the supply connection terminals (73) of sensor elements (14) lying in one line;
- a common select/supply line coupled to the first control connection terminals (71) of sensor elements (14) lying in one line; and
- a reset line coupled to the second control connection terminals (72) of sensor elements (14) lying in one line.

* * * * *